July 16, 1940.   A. GLASER ET AL   2,208,455
DRY PLATE ELECTRODE SYSTEM HAVING A CONTROL ELECTRODE
Filed Nov. 13, 1939
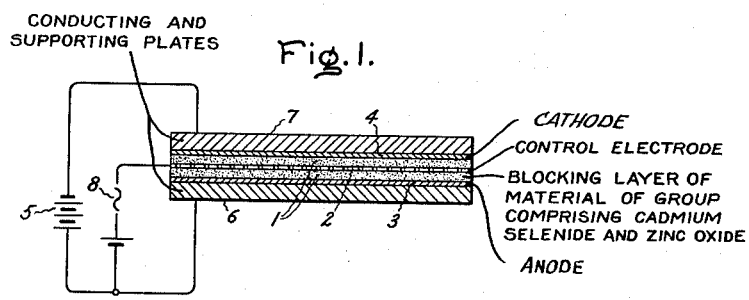
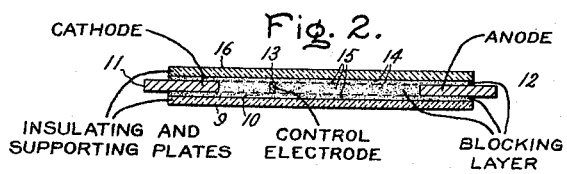
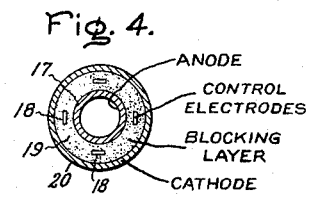
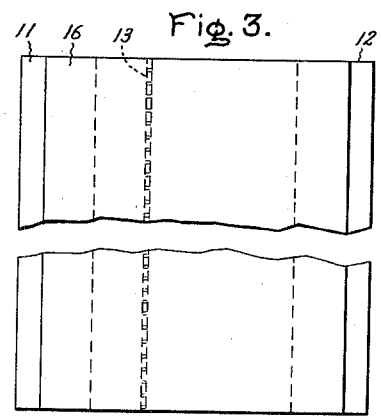
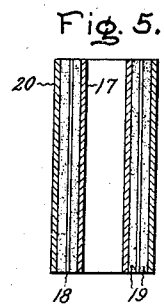
Inventors:
August Glaser,
Werner Koch,
Heinz Voigt,
by Harry E. Dunham
His Attorney.

Patented July 16, 1940

2,208,455

UNITED STATES PATENT OFFICE 2,208,455

DRY PLATE ELECTRODE SYSTEM HAVING A CONTROL ELECTRODE

August Glaser, Berlin-Frohnau, Werner Koch, Berlin-Glienicke Nordbahn, and Heinz Voigt, Berlin-Nikolassee, Germany, assignors to General Electric Company, a corporation of New York Application November 13, 1939, Serial No. 304,262
In Germany November 15, 1938

6 Claims. (Cl. 175—366)

Our invention relates to dry plate electrode systems of unsymmetrical conductivity the electro-positive electrode and the electro-negative electrode of which are separated by a dielectric and which are provided with one or more control electrodes mounted between these main electrodes and embedded in the dielectric.

Electrode systems of the above character proposed heretofore have been found to produce, in general, unsatisfactory results since the dielectrics employed, such for example as artificial resin, do not in practice, permit the passage of electrons.

It is the general object of our present invention to produce dry plate electrode systems of unsymmetrical conductivity wherein the above and other disadvantages of similar systems proposed heretofore are obviated.

In accordance with our invention this object is attained by employing as a dielectric in which the control electrode structure is embedded, a crystalline metal compound which, though in itself an insulator, is arranged to contain conductive portions or conductive "centers" which under suitable conditions form a path for the electron conduction. Such "centers" may be formed by providing in excess a suitable component of the metal compound, that is, by changing or distorting the stoichiometrical equilibrium of the compound.

Crystalline substance of this kind exists in large numbers. In most cases, however, the desired action of the electron conduction mechanism occurs only with an undesirable increase of the temperature. In accordance with the present invention crystalline substances having a high refractive index ($n>2$) which have the properties referred to hereinbefore are selected. In these substances the electron conduction begins even at room temperature. For example, cadmium selenide and zinc oxide are found to be suitable materials for the dielectric layer.

The disturbance or distortion of the stoichiometrical equilibrium of the compound, or in more general terms the production of the conductive "centers," may be effected in various ways. In accordance with one simple process for this purpose the crystalline substance may be subjected at increased temperature to the vapor of a suitable element. If cadmium selenide is employed as the compound it is preferably subjected to the vapor of selenium, 20% of excess selenium being added for example. If zinc oxide is selected, it is oxygen treated to provide excess oxygen in the crystalline layer.

The non-symmetrical conductivity in a system in which as dielectric a layer of the kind above described is employed is produced through the proper selection of the main electrodes. As cathode a material is employed which can emit electrons and therefore possesses an electropositive characteristic. It has been found, for example, that good results are obtained by the use of calcium as the cathode. Under certain conditions other cathode material, as magnesium or aluminum, may be used. Further, the cathode may be constructed for more efficient emission of electrons by a roughening of its surface, which is accomplished, before assembly, by the anodic polarization process for example. For the anode on the other hand, a metal is employed, such as platinum or gold, which does not emit electrons.

The embedding of the control electrode within the described crystalline dielectric does not present any fundamental difficulties. The crystalline layer may be caused to grow out from and around the electrode, the latter being heated for this purpose. Or the layer may be deposited by an electrolytic process, or by a vaporizing process.

It is essential, however, that "grid emission" analogous to that which may occur in thermionic discharge tubes be prevented. For this purpose, in accordance with the present invention the control electrode is formed of a metal or material which is electro-negative relative to the anions of the crystalline layer.

Our invention will be better understood from the following description when considered in connection with the accompanying drawing and its scope will be pointed out in the appended claims.

Referring to the drawing, Fig. 1 is a diagrammatic illustration of a controllable electrode system of unsymmetrical conductivity in accordance with our invention, Figs. 2 and 3 are respectively cross sectional and plan views of a flat or ribbon type dry plate electrode cell or element embodying our invention, and Figs. 4 and 5 are respectively cross sectional views across and axially of a cylindrical type dry plate electrode cell or element in accordance with our invention.

In Fig. 1 in a crystalline layer 1 preferably of cadmium selenide to which has been added an excess of selenium, a perforated control electrode 2 consisting of platinum or other suitable material is embedded. A layer 3 consisting of a suitable material as graphite or platinum is vaporized to one side of the dielectric layer 1 to function as an anode. On the opposite side of the dielectric layer 1 a layer 4 consisting of a material adapted to emit electrons, for example calcium, is provided to function as a cathode. The supply of anode current, as from a source 5, may be effected through plates or electrodes 6, 7, of suitable metallic material or of graphite, pressed respectively to the anode and cathode. If now an anode voltage, as from the source 5 is applied across the main electrodes 3 and 4, and if a grid voltage varying from negative to positive values is supplied to the control electrode 2 as from a source indicated by 8, an anode current or grid voltage characteristic is obtained which is typical of amplifier tubes or like valve devices. Such systems as illustrated in Fig. 1 are therefore applicable in practice as "audions" and amplifiers, in the same manner as the corresponding grid controlled vacuum tubes.

In the plate or ribbon type cell or element illustrated in Figs. 2 and 3 it will be understood that the length of the completed element is preferably considerably greater than its width. In forming the element, suitable blocking material, preferably cadmium selenide having an excess of selenium to produce the electron-conducting "centers," is first deposited, preferably by vaporization, on a supporting plate 9 preferably of insulating material, to form a partial layer 10. On this partial layer 10 of blocking material are then arranged the cathode 11, anode 12, and control electrode 13, all of material as disclosed in connection with the embodiment illustrated in Fig. 1. The cathode and anode are mounted at opposite sides of the plate 9, preferably extending outwardly therefrom to facilitate connection of anode current leads (not shown) to the element, the control electrode 13 being mounted intermediate the two main electrodes. The control electrode is preferably of multiple form, or it may be perforated as illustrated in Fig. 3, in order to provide a better path for the electrons and to reduce the internal resistance of the element. A further partial layer 14 of the same blocking material as that of partial layer 10 is then vaporized to the element in such manner that the control electrode 13 is completely enveloped by the blocking material forming the complete layer 15 and the main electrodes 11 and 12 are enveloped up to the point of attachment thereto of the current conducting leads. For the protection of the partial blocking layer a further cover or supporting plate 16 of insulating material is preferably provided.

In the cylindrical type of element illustrated in Figs. 4 and 5 the anode is constituted by a wire, rod or tube 17 preferably of cylindrical cross section, of the same material as specified for the anodes of the embodiments illustrated in Figs. 1 to 3. Cadmium or a similar suitable dielectric material is vaporized to the anode to a predetermined depth and upon the partial blocking layer thus formed a number of control electrodes for example in the form of thin metal filaments 18 are arranged. Thereafter a further partial layer of the dielectric is vaporized to the first layer thereby embedding the control electrode structure in the complete blocking layer 19. The construction of the device is such that the outer surface of the layer 19 is in contact with a cylindrical cathode 20. For obtaining a close contact of the dielectric with the cathode the latter is preferably formed by vaporizing a suitable material, as calcium, to the outer surface of the blocking layer 19.

In this manner controllable dry plate rectifiers or like devices may be produced which are characterized by high field intensities and low inherent capacity. The production of the blocking or dielectric layer by the vaporizing process offers the advantage that layers of the material having changed or disturbed stoichiometrical equilibrium may readily be formed which lie, throughout their extent, in close contact with main electrodes of the most varied shapes.

Our invention has been described herein in particular embodiments for purposes of illustration. It is to be understood, however, that the invention is susceptible of various changes and modifications and that by the appended claims we intend to cover any such modifications as fall within the true scope and spirit of our invention.

What we claim as new and desire to secure by Letters Patent of the United States is:

1. In an electrode system of non-symmetrical conductivity, a cathode, an anode, a dielectric layer separating said cathode and anode and composed of a crystalline material characterized by relatively high refractive index and distorted stoichiometrical equilibrium, and a control electrode embedded in said dielectric layer.

2. In an electrode system of non-symmetrical conductivity, a cathode, an anode, a dielectric layer separating said cathode and anode and composed of a material of the group comprising cadmium selenide and zinc oxide, said material including an excess of one of the components thereof to form electron conduction portions in the path between said cathode and anode, and a control electrode embedded in said dielectric layer.

3. In an electrode system of non-symmetrical conductivity, a cathode, an anode, a dielectric layer separating said cathode and anode and composed of a crystalline material having its stoichiometrical equilibrium changed by the addition to said material of an excess of one of the components thereof to form electron conduction centers in the path between said cathode and anode, and a control electrode embedded in said layer and composed of a material electro-negative with respect to said centers.

4. In an electrode system of non-symmetrical conductivity, an insulating and supporting plate, a dielectric layer deposited thereon and composed of a crystalline material having its stoichiometrical equilibrium changed by the addition to said material of an excess of one of the components thereof to form electron conduction centers in said layers, a cathode plate and an anode plate embedded in said dielectric layer at opposite edges of said supporting plate, a control electrode embedded in said dielectric layer intermediate said cathode and anode plates, and a second insulating plate in contact with said dielectric layer and on the opposite side thereof from said first-named insulating plate.

5. In an electrode system of non-symmetrical conductivity, a cylindrical anode, a dielectric layer deposited on said anode and composed of a crystalline material having its stoichiometrical equilibrium changed by the addition to said material of an excess of one of the components thereof to form electron conduction centers in said layer a control electrode embedded in said layer, and a cylindrical cathode in contact with the surface of said layer opposite to said anode.

6. In an electrode system of non-symmetrical conductivity, a cylindrical anode, a dielectric layer vaporized on said anode and composed of a crystalline material having its stoichiometrical equilibrium changed by the addition to said material of an excess of one of the components thereof to form electron conduction centers in said layer, a control electrode embedded in said layer, and a layer of cathode material vaporized to the surface of said dielectric layer opposite to said anode.

AUGUST GLASER.
WERNER KOCH.
HEINZ VOIGT.